3,369,907
PREPARATION OF YEAST-RAISED BAKED PRODUCTS EMPLOYING A BLEND OF A MONOGLYCERIDE AND A LOWER MONOCARBOXYLIC ACID ESTER OF A POLYHYDRIC ALCOHOL

William H. Knightly, Wilmington, Del., assignor to Atlas Chemical Industries, Inc., Wilmington, Del., a corporation of Delaware
No Drawing. Filed July 24, 1964, Ser. No. 385,030
5 Claims. (Cl. 99—91)

ABSTRACT OF THE DISCLOSURE

A softener and mold inhibitor for yeast-raised baked products comprising a blend of a low iodine value monoglyceride and a lower monocarboxylic acid ester of a polyhydric alcohol is incorporated into the ingredients of the sponge or dough of the product prior to baking.

---

This invention relates to a composition of matter which is useful as a softener and mold inhibitor in baked products. In particular, this invention relates to using a blend of a normally hard, low iodine value monoglyceride and a lower monocarboxylic acid ester of a polyhydric alcohol as a softener and mold inhibitor in baked products.

It is current practice in the baking industry to use mono- and diglycerides to retard the rate of crumb firming, and sodium or calcium propionate to inhibit the rate of mold growth. This makes it necessary for the bakeries to store two materials and to handle and measure two materials during the baking operation.

In the preparation of baked products, it is often difficult to completely disperse the mono- and diglyceride softening agents into the dough or batter for the mixing time is limited to a few minutes and no heat is applied sufficient to melt hard glycerides. Therefore, the mono- and diglycerides which are used as softening agents are usually soft pastes or plastic materials which generally means that they have relatively high iodine values.

The calcium or sodium propionates, which are used as mold inhibitors, are very effective in retarding the growth of mold but also adversely affect the functioning of the yeast in yeast-leavened baked products. These propionate salts greatly increase proof time and may also adversely affect the grain and volume of the resulting product.

It is an object of this invention to provide a composition which is an effective softener and mold inhibitor for baked products.

Another object of the invention is to provide a composition containing a low iodine value monoglyceride which is readily dispersed in the dough or batter of baked products.

An additional object is to provide a mold inhibitor for yeast-leavened baked products which does not adversely affect proof time.

A further object of this invention is to provide an improved method of preparing baked products.

Other objects and purposes of this invention will be apparent to those skilled in the art in view of the description which follows.

It has been discovered that a composition consisting essentially of a normally hard, low iodine value monoglyceride having an average iodine value in the range of about 6 to about 45 and a lower monocarboxylic acid ester of a polyhydric alcohol having from 2 to 6 hydroxyl groups is an effective softening agent and mold inhibitor for baked products. This is a significant improvement in the art of making baked products, for one product now performs the functions which formerly required two products. The resulting saving in storing, handling and measuring one product rather than two is substantial. In addition, there is no problem of dusting associated with these compositions.

Several attempts were made at formulating compounds and compositions to function as combined softeners and mold inhibitors. All of the early attempts resulted in products which were either not as effective as currently used softening agents and/or did not give sufficient protection against the development of mold. Finally it was found that normally hard, low iodine value monoglycerides are exceptionally effective softening agents for baked products. But this presented the problem of incorporating the monoglyceride into the dough or batter, for low iodine value monoglycerides are generally hard materials which are not readily dispersed in dough or batter. This problem is accentuated by the fact that the time for mixing the dough or batter may be limited to a few minutes and there is no heat applied sufficient to melt hard glycerides, for it is well known that overmixing tends to have an adverse effect on the resulting baked product.

In accordance with this invention, a normally hard, low iodine value monoglyceride having an average iodine value in the range of about 6 to about 45 is blended with a lower monocarboxylic acid ester of a polyhydric alcohol having from 2 to 6 hydroxyl groups to yield a soft paste or plastic material which is readily dispersed in dough or batter. It should be noted that a monoglyceride prepared from a monocarboxylic acid of about 12 carbon atoms (lauric acid) or its equivalent may have a low iodine number and still be a soft paste or plastic material. As used in this specification and the claims which follow, the term "normally hard, low iodine value monoglyceride" is meant to include monoglycerides prepared from monocarboxylic acids containing at least 12 carbon atoms per molecule, and therefore includes laurates which may be plastic materials. Monoglycerides prepared from lauric acid having iodine values of about 6 to about 10 may be sufficiently dispersable as to be useful in accordance with this invention, but in general, the minimum iodine value should be about 15.

Generally, as the carbon atom content of the monocarboxylic acid used to prepare the low iodine value monoglyceride increases, the monoglyceride becomes a harder material, and in order to obtain ready dispersibility, the minimum iodine value should be higher. Of course, more of the lower monocarboxylic acid ester may be blended with the normally hard, low iodine value monoglyceride to render it more dispersible, but this reduces the effectiveness of the blend as a softener. It is particularly preferred to use normally hard, low iodine value monoglycerides prepared from monocarboxylic acids containing from about 16 to about 20 carbon atoms per molecule for these monoglycerides are particularly effective softeners. When using these preferred monoglycerides, they should have iodine values ranging from about 20 to about 36 in order to insure their dispersibility in dough or batter, Of particular importance is the fact that the compositions of this invention are as effective or more effective than currently used softening agents, and in addition, they function as mold inhibitors. With respect to mold inhibition, the compositions of this invention are effective mold inhibitors without adversely affecting proof time or the volume and grain of the resulting baked product.

The normally hard, low iodine value monoglycerides, which term is meant to include mixtures of mono-, di- and/or tri-glycerides, which are useful in the compositions of this invention are those having an average iodine value in the range of about 6 to about 45, with an iodine value of about 20 to about 36 being particularly preferred. It is within the scope of this invention to use monoglycerides having iodine values outside of this range by blending them with a monoglyceride having an iodine value sufficient to form a monoglyceride mixture having an iodine value within the stated range. If the normally hard, low iodine value monoglyceride component of the compositions of this invention has an iodine value less than about 6, it is necessary to add more lower monocarboxylic acid ester to render the composition sufficiently plastic than is required for effective mold inhibition and the effectiveness of the blend as a softener is impaired. On the other hand, if the iodine value of the glyceride is more than about 45, the softening properties of the blended composition will not be as effective as currently used softening agents. It has been found that monoglycerides or monoglyceride mixtures having average iodine values in the range of from about 20 to about 36 are particularly effective softening agents and can be rendered sufficiently plastic by the amount of lower monocarboxylic acid ester required for effective mold inhibition.

The lower monocarboxylic acid esters of a polyhydric alcohol having from 2 to 6 hydroxyl groups which are useful in the compositions and method of this invention are effective mold inhibitors and softening agents. Since these compounds are to be incorporated into baked products which are to be ingested, it is essential that they be edible. The polyhydric alcohol may be completely esterified or partial esters may also be used. Conventional esterification procedures may be used to prepare these esters. Typical of the polyhydric alcohols which may be used are propylene glycol, dipropylene glycol, glycerol, erythritol, pentaerythritol, arabitol, xylitol, sorbitol, mannitol, and cyclic inner ethers of polyhydric alcohols having at least 2 hydroxyl groups such as isosorbide, sorbitan, isomannide and mannitan.

The lower monocarboxylic acids which may be used to esterify the polyhydric alcohol are the monocarboxylic acids having from 2 to 7 carbon atoms. Examples of monocarboxylic acids which may be used are acetic, propionic, butyric, valeric, caproic, sorbic and benzoic. Propionic acid has been found to be particularly effective. In addition to using the acids, their equivalent anhydrides, halides and esters may also be used to prepare the esters of polyhydric alcohols.

In general, the lower monocarboxylic acid esters of a polyhydric alcohol having from 2 to 6 hydroxyl groups should be blended with the low iodine value monoglyceride in amounts sufficient to render the mixture a soft paste or plastic material. The blend must be soft enough to be thoroughly dispersed in the dough at room temperature. The amount of lower monocarboxylic acid ester required will vary depending upon the hardness of the monoglyceride and the particular ester which is used. Usually more ester is required as the iodine value of the monoglyceride decreases and the molecular weight of the lower monocarboxylic acid ester increases. It has been found that blends containing from about 20 to about 75 weight percent of lower monocarboxylic acid ester are generally soft enough to be dispersed in the dough. If more than about 75 weight percent of the lower monocarboxylic acid ester is present, the blend will not be as effective as currently used softening agents at comparable levels.

The normally hard, low iodine value monoglyceride-lower monocarboxylic acid ester of a polyhydric alcohol composition may be prepared by melting the normally hard, low iodine value monoglyceride and then incorporating the lower monocarboxylic acid ester in the melt. Thereafter, the melt may be mixed thoroughly on a Votator to form a uniform mixture and then cooled to form a plastic, readily dispersible composition. If more than one normally hard, low iodine value monoglyceride or monoglyceride mixture is to be used, one of the monoglycerides may be melted and the other monoglycerides and the lower monocarboxylic acid ester added to the melt in any order, so long as the temperature of the melt is sufficient to melt all of the added components.

The compositions of the present invention are usually incorporated into baked products in amounts which are sufficient effectively to inhibit the growth of mold during storage for durations of about a week and also sufficient to preserve the softness of the product during storage. In general, amounts of the lower monocarboxylic acid ester as little as about 0.04% based on the weight of the flour contained in the product are sufficient for effective mold growth inhibition in the product. Since greater amounts of the compositions of the present invention are required to impart the desired softening or anti-staling characteristics to the baked product, the critical concentrations of the said composition in the baked product are accordingly determined by the amounts required for that purpose. In general, in yeast leavened products, from about 0.2% to about 1.0% of the composition based upon the weight of the flour in the product is sufficient to impart both mold growth inhibition and softness or anti-staling properties to the baked product; in baked products which do not contain yeast, however, the compositions of the present invention are usually used in amounts within a range of about 0.8% to about 20.0% based upon the weight of the flour in the baked product.

The following examples illustrate the preparation of lower monocarboxylic acid esters of polyhydric alcohols of from 2 to 6 hydroxyl groups, the formation of blends of lower monocarboxylic acid esters with normally hard, low iodine value monoglycerides and the preparation of baked products.

EXAMPLE I

*Preparation of propionate esters of glycerin*

About 460 g. of glycerin (5 moles) were placed in a 3-necked flask equipped with a mechanical stirrer, condenser, thermometer and dropping funnel. 1250 g. (9.65 moles) of propionic anhydride was added dropwise at a temperature of 125–130° C. over a period of 2.25 hours. The reaction mixture was heated for 8 hours at 100–110° C. after the propionic anhydride had been added. Propionic acid was stripped off under reduced pressure, and the resulting mixture was distilled over a 10 inch Vigreaux column. The following four liquid cuts were collected:

|  | Pot Temp. (° C.) | Vap. Temp. (° C.) | Sap. No. | OH No. | Acid No. | Grams Collected | Yield, Percent |
|---|---|---|---|---|---|---|---|
| Cut No. 1 | 110–115 | 98–100 | 542 | 298.5 | 7.45 | 176 | 18.2 |
| Cut No. 2 | 116 | 107 | 548 | 274 | 1.07 | 135 | 14.1 |
| Cut No. 3 | 114–121 | 105–110 | 561 | 244 | 0.65 | 243 | 25.4 |
| Cut No. 4 | 117–120 | 105–110 | 570 | 190 | 0.30 | 360 | 38.1 |
| Residue |  |  | 561 | 158 | 0.66 | 40 | 4.2 |

The approximate composition of each fraction was as follows:
Cut No.—
1------ 5% mono- and 95% dipropionate
2------ 100% dipropionate
3------ 2% mono- and tri- and 98% dipropionate
4------ 70% di- and 30% tripropionate

EXAMPLE II

*Preparation of isosorbide dipropionate*

A three liter, 3-necked flask equipped with a stirrer, thermometer, dropping funnel and a reflux condenser was charged 438.3 g. (3 moles) of isosorbide and 2 g. of p-toluene-sulfonic acid. The isosorbide was heated to 80° C., and then 858 g. (6 moles plus 10% excess) of propionic anhydride were added dropwise with stirring over a 90 minute period. The temperature during the addition varied between 80–90° C. Thereafter, the reaction mixture was heated for 10 hours at 100° C. and then for 4 hours at 155–160° C., after which propionic acid and excess propionic anhydride were stripped off under vacuum.

The resulting liquid product was treated with 10 g. of activated carbon and distilled through a 10 inch Vigreaux column at 135–138° C. and 0.5 mm. pressure. 540 g. of isosorbide dipropionate having a saponification No. of 432, OH No. of 0.38 and acid No. of 0.37 was obtained.

EXAMPLE III

*Formation of a blend of a normally hard, low iodine value monoglyceride and a glyceryl propionate*

Blends of normally hard, low iodine value monoglycerides blended with glyceryl dipropionate and glyceryl tripropionate were prepared. A mono- and diglyceride mixture having an iodine value of about 2 was heated to a temperature of about 150° F. After a melt was formed, another mono- and diglyceride mixture having an iodine value of about 36 was added to the melt. After both monoglyceride mixtures were completely melted, they were separate into two portions and glyceryl dipropionate was added to one portion and glyceryl tripropionate to the other. Then each portion was votated and cooled to form a plastic composition. The weight ratios of the components of the two compositions was as follows:

COMPOSITION A

| | Parts by weight |
|---|---|
| Mono- and diglyceride mixture (I.V. 36) | 38 |
| Mono- and diglyceride mixture (I.V. 2) | 22 |
| Glyceryl dipropionate | 40 |

COMPOSITION B

| | Parts by weight |
|---|---|
| Mono- and diglyceride mixture (I.V. 36) | 38 |
| Mono- and diglyceride mixture (I.V. 2) | 22 |
| Glyceryl tripropionate | 40 |

The blend of the two monoglyceride mixtures used in Compositions A and B had an average iodine value of 23.5.

| Dough: | Percent (flour at 100%) |
|---|---|
| Flour | 35 |
| Sugar | 8 |
| Salt | 2 |
| Lard | 3 |
| Milk powder | 6 |
| Water | [1] Variable |
| Softener and mold inhibitor | 0.50 |

[1] 57% of the total water was added to the sponge and 43% was added to the dough. The total amount of water used varied depending upon the flour absorption properties. The amount of water required was determined by a farinograph method which is described in Cereal Laboratory Methods compiled by the American Association of Cereal Chemists, 6th Edition, pp. 132–139.

The sponges were prepared by dissolving the yeast in a portion of the water, and this composition was added to a mixer along with flour, yeast food and the balance of the water. These ingredients were mixed for about 3 minutes and thereafter fermented for about 4.5 hours.

The fermented sponges were returned to the mixer and all of the dough ingredients were added. The dough-sponge mixtures were mixed to full development (usually about 11 to 13 minutes), fermented for 20 minutes, divided, allowed a 10 minute proof, sheeted, molded, sealed and placed into bread pans. Then the dough was proofed at about 100° F. and 85% relative humidity in the usual manner to template height and baked for about 20 minutes at 425° F.

Prior to baking, the bread dough was evaluated for dough conditioning properties and proof time. After baking, the bread was evaluated for volume, grain, softness and mold inhibition. Softness studies on half-inch thick bread slices were carried out over a period of 6 days using a gelometer to determine softness. The gelometer value represents the number of grams of shot required to depress the gelometer plunger a given distance (4 mm. in these evaluations) into the bread slice. The mold inhibition test comprised exposing the loaves of bread to room conditions and then storing them at 100° F. and 85% relative humidity.

Compositions A and B of Example III were evaluated as softeners and mold inhibitors and were compared to a standard which contained 0.15% calcium propionate as a preservative. The following results were obtained:

| Softener and Mold Inhibitor | Dough Conditioning | Proof Time (min.) | Volume (cc.) | | | | | Gelometer Values (Avg.) | | Grain, 6 Days | Mold Inhibition (days) |
|---|---|---|---|---|---|---|---|---|---|---|---|
| | | | A | B | C | D | Avg. | 3 Days | 6 Days | | |
| Standard (no softener). | Very good | 73 | 2,535 | 2,460 | 2,575 | 2,605 | 2,544 | 326 | 400 | Good | More than 13. |
| Composition A | do | 70 | 2,650 | 2,535 | 2,550 | 2,750 | 2,621 | 279 | 328 | do | Do. |
| Composition B | do | 68 | 2,655 | 2,575 | 2,605 | 2,600 | 2,609 | 268 | 327 | do | Do. |

EXAMPLE IV

*Preparation of bread using softening agent-mold inhibitor compositions*

The following bread formula and procedures were used to evaluate Compositions A and B of Example III as bread softeners and mold inhibitors according to the sponge-dough method.

| Sponge: | Percent (flour as 100%) |
|---|---|
| Flour | 65 |
| Water | [1] Variable |
| Yeast | 2.5 |
| Yeast food | 0.5 |

These results indicate that both Compositions A and B were effective bread softeners and mold inhibitors.

As used in the claims which follow, the term "consisting esesntially of" includes compositions containing the named ingredients and any other ingredients which do not deleteriously affect the compositions for the purposes stated in the specification.

Having completely described this invention, what is claimed is:

1. In the preparation of a yeast-raised baked product, the improvement which comprises incorporating into the wet ingredients thereof prior to baking from about 0.2 percent to about 20.0 percent by weight, based upon the weight of the flour contained in said product, of an antistalant and antimycotic composition consisting essentially of a blend of a normally hard, low iodine value monoglyceride having an average iodine value in the range of about 6 to about 45 and an ester of a lower monocarboxylic acid having from 2 to 7 carbon atoms in the carbon chain and a polyhydric alcohol having from 2 to 6 hydroxyl groups, said lower monocarboxylic acid ester being present in amounts ranging from about 20 to about 75 weight percent of the composition and baking the resulting product.

2. The improvement of claim 1 in which the lower monocarboxylic acid ester is a propionate.

3. The improvement of claim 2 in which the lower monocarboxylic acid ester is a glyceryl propionate.

4. The improvement of claim 3 in which the lower monocarboxylic acid ester is glyceryl dipropionate.

5. The improvement of claim 3 in which the lower monocarboxylic acid ester is glyceryl tripropionate.

References Cited
UNITED STATES PATENTS

| | | | |
|---|---|---|---|
| 2,509,414 | 5/1950 | Barsky | 99—118 |
| 2,745,749 | 5/1956 | Feuge et al. | 99—118 |
| 2,764,605 | 9/1956 | Embree et al. | 260—410.8 |
| 2,966,411 | 12/1960 | Weiss | 99—118 |
| 3,244,534 | 4/1966 | Buddemeyer et al. | 99—91 |
| 3,257,213 | 6/1966 | Colby | 99—94 |

RAYMOND N. JONES, *Primary Examiner.*